United States Patent [19]
O'Malley

[11] 3,725,505
[45] Apr. 3, 1973

[54] PYRENE CONTAINING POLYMERS PREPARED BY ANIONIC POLYMERIZATION

[75] Inventor: James J. O'Malley, Webster, N.Y.

[73] Assignee: Xerox Corporation, Stamford, Conn.

[22] Filed: July 28, 1970

[21] Appl. No.: 59,016

[52] U.S. Cl............260/879, 260/93.5 C, 260/827, 260/875, 260/880 B, 260/881, 260/885, 260/886, 260/874
[51] Int. Cl..........................C08f 7/02, C08f 19/00
[58] Field of Search......260/879, 880 B, 93.5 C, 827, 260/874, 875, 881, 885, 886, 887

[56] References Cited

UNITED STATES PATENTS

| | | | |
|---|---|---|---|
| 2,496,867 | 2/1950 | Flowers | 260/669 |
| 2,496,868 | 2/1950 | Flowers | 260/87.3 |
| 3,169,060 | 2/1965 | Hoegl | 96/1 |
| 3,299,174 | 1/1967 | Kuhre et al. | 260/876 |
| 3,309,423 | 3/1967 | D'Alelio | 260/885 |
| 3,330,785 | 7/1967 | Boyd | 260/2.5 |

Primary Examiner—James A. Seidleck
Assistant Examiner—William F. Hamrock
Attorney—James J. Ralabate, David C. Petre and Gaetano D. Maccarone

[57] ABSTRACT

An anionic polymerization process for forming homopolymers of vinylpyrene and block copolymers containing at least one polyvinylpyrene segment is disclosed. Block copolymers having novel structures are also described.

15 Claims, No Drawings

PYRENE CONTAINING POLYMERS PREPARED BY ANIONIC POLYMERIZATION

BACKGROUND OF THE INVENTION

This invention relates to a process for the preparation of block polymers and more particularly to a novel process for preparing homopolymers of vinylpyrene and block copolymers containing polyvinylpyrene as well as the novel block copolymers obtained therefrom.

It is known that various types of polymers can be prepared from various monomeric materials with the particular product formed being generally dependent upon the procedure followed in contacting the material in the polymerization zone. Linear macromolecules are classified as homopolymers if all of their segments are identical whereas they are described as copolymers if such is not the case. Random copolymers, i.e., those in which units of different types are distributed along the chain in a haphazard arrangement without forming a regular pattern, may be made by the simultaneous polymerization of copolymerizable monomers. Another type of polymer is the graft polymer which results from the joining of comonomer to an already formed polymer at random points along the chain. A further type of polymer is obtained by a procedure known as block polymerization. These polymers, usually referred to as block polymers or copolymers, are formed by polymerizing a monomer onto the end of a polymer chain, the monomer being introduced in a manner such that substantially all of the coreacting molecules enter the polymer chain at that point. The particular method used in preparing the polymers has a great influence upon the properties of the products obtained. Homopolymers and copolymers obtained from the random, graft and block polymerization methods respectively differ greatly in their properties even though the weight per cent of each of the monomer materials contained in the polymers may be the same. Block polymerization methods are advantageous in the preparation of materials since the reaction products can be made to have specific desired properties.

SUMMARY OF THE INVENTION

It is an object of this invention to produce a process forming homopolymers of vinylpyrene and block copolymers containing at least one vinylpyrene segment.

It is another object to provide such a process in which the polymerization of the monomers is initiated by carbanion or electron transfer catalysts.

It is still another object to provide novel reaction products made by the anionic polymerization process.

Now according to the present invention it has been found to be possible to prepare homopolymers of vinylpyrene and block copolymers containing at least one polyvinylpyrene segment by an anionic polymerization process. In one embodiment of the invention vinylpyrene is contacted with a polymerization initiator which may be a mono or difunctional anion, a radical anion or an alkali metal in the presence of a diluent such as, for example, tetrahydrofuran. The reaction may be terminated at any point to obtain homopolymers of vinylpyrene having varying characteristics by introducing a terminator material, as will be hereinafter described, into the reaction zone. According to another embodiment of the invention a monomer, which may be vinylpyrene or another monomer which is copolymerizable therewith in accordance with the process of the invention, can be contacted with a polymerization initiator of the type described in the presence of a diluent so as to form a polymer block of the selected monomer and, after polymerization of substantially all of the selected first monomer, introducing into the reaction zone a second monomer which is copolymerizable with the first formed polymer segment. One of the monomers will be vinylpyrene; the determination of whether it is the first or the second monomer is dependent upon the final reaction product desired to be made and the characteristics of the other monomer with which it is copolymerized as will become clearly apparent from the following detailed description of the invention.

Any suitable monomer which is subject to nucleophilic addition under the conditions of the process may be copolymerized with vinylpyrene. By nucleophilic addition is meant the attack of an electron-rich carbon atom on a relatively electron-deficient species with the consequent formation of a covalent carbon-carbon bond. It has been theorized that the anionic polymerization process takes place because the monomers which can be polymerized in this manner possess a carbon atom which has an electropositive nature with respect to other atoms around it. Thus, the electropositive carbon atom may be attacked by the anionic nature of the initiator molecules. Typical monomers which will undergo anionic polymerization with vinylpyrene to form novel block copolymers according to the process of the invention include dienes such as 1,3-butadiene, 1,3-pentadiene (piperylene), 2-methyl-1,3 butadiene (isoprene), and 2,3-dimethyl-1,3 butadiene; vinyl substituted aromatic hydrocarbons such as styrene, 2-methylstyrene, vinyl toluene, 4-vinyl biphenyl and 1-vinylnapthalene; vinyl substituted heteroaromatics such as 2-vinylpyridine, 4-vinylpyridine, 3-methyl-5-vinylpyridine, 3,5-diethyl-5-vinylpyridine, and and 2-vinylquinoline; methacrylates and acrylates, for example, esters of methacrylic and acrylic acid such as methyl, ethyl, propyl, butyl, hexyl, cyclohexyl, and benzyl; vinyl substituted nitriles and N,N-disubstituted amides such as acrylonitrile, methacrylo-nitrile, N,N-dimethacrylamide and N,N-diethylmethacrylamide; aldehydes such as formaldehyde, acetaldehyde, butyraldehyde and heptaldehyde; isocyanates such as butyl isocyanate, hexyl isocyanate, phenyl isocyanate, 2-naphthyl isocyanate, and 2-anthryl isocyanate; siloxanes such as cyclic octamethyl tetrasiloxane; cyclic ethers and cyclic thioethers such as ethylene oxide, ethylene episulfide, propylene oxide and propylene episulfide; cyclic esters or lactones such as caprolactone.

The general classes of materials suitable for use as polymerization initiators according to the process of the invention are alkali metals, radical ions, and mono- and difunctional alkyl and arylalkyl carbanions. Typical polymerization initiators include alkali metals such as lithium, sodium, potassium, cesium and rubidium; radical ions such as alkali metal adducts of condensed ring aromatics such as naphthalene, biphenyl, anthracene and phenanthrene; monofunctional alkyl and arylalkyl carbanions such as n-butyl lithium, sec-butyl lithium, sec-amyl lithium, t-hexyl lithium, phenyl isopropyl potassium, phenyl isopropyl cesium and 1,1 diphenyl hexyl lithium; difunctional alkyl and arylalkyl carbanions such as 1,2 dilithio-1,2 diphenyl ethane, 1,4 dilithio-butane, potassium α-methyl styrene tetramer dianion, and sodium α-methyl styrene dimeric dianion.

Generally the embodiment of the invention whereby block copolymers having at least two different segments, one of which is polyvinylpyrene, are made is preferably carried out by contacting a monomer, e.g., vinylpyrene in a reaction zone with a polymerization initiator in the presence of a suitable diluent and allowing the reaction to proceed until the monomer has been substantially completely polymerized. At this point the initiator material will typically be completely exhausted but the polymer which is formed is a "living" polymer, i.e., one which itself has a unit or units which are anionic in nature on the end(s) of the polymer chain and which will allow it to initiate polymerization of another monomer. Subsequently another monomer of a type which is copolymerizable with the first formed "living" polymer is charged into the reaction zone. The second monomer undergoes polymerization onto the end of the first formed polymer chain until substantially all of the second monomer has been polymerized. A third monomer may then be added to the reaction zone if so desired. In this manner it is possible to make block copolymers having a number of different segments.

It should be emphasized that there is a preferred sequence in which the individual monomers employed to form block copolymers in any particular instance must be added to the reaction zone. Monomers resulting in strongly nucleophilic polymeric anions are added first and these are followed by monomers forming more weakly nucleophilic polymeric anions. Thus, in the formation of block copolymers by the anionic polymerization process, the monomer contacted first with the polymerization initiator must be one which is capable of initiating polymerization of the second monomer after having itself undergone polymerization. Therefore, the first monomer added to the reaction zone can be vinylpyrene or it may be one of the monomers described previously as being copolymerizable therewith according to the process depending upon the relative position of each on the nucleophilic scale as will be readily apparent to those skilled in the art. Should the first monomer not be one which, after undergoing polymerization in the presence of the polymerization initiator, is capable of initiating polymerization of the second monomer subsequently charged into the reaction zone a block copolymer will not be formed. For example, vinylpyrene may be the first monomer with methyl methacrylate, the second and a block copolymer having at least one segment of each will result. However, if, in this particular instance, the order of addition is reversed, a block copolymer will not be obtained for the polymethyl methacrylate can not initiate polymerization of vinylpyrene. In this case there would be formed a homopolymer of methyl methacrylate and the vinylpyrene monomer would not react with it.

It should be appreciated by those skilled in the art that in some cases, two particular monomers which are sought to be copolymerized would each be suitable to initiate polymerization of the other. Thus, the consideration as to which should be introduced first into the polymerization zone would be dependent upon the properties desired in the final product. For example, where vinylpyrene and 1,3 butadiene are to be copolymerized either could be the first monomer for either, after having undergone polymerization in contact with a polymerization initiator, would be capable of initiating polymerization of the other.

The novel block copolymer products made according to the invention are preferably made up of blocks or segments, each of which is a homopolymer of one of the monomers employed in the process. However, it should be recognized that the block copolymers of the invention may include copolymer blocks and homopolymer blocks or only copolymer blocks. Thus, while the invention is especially applicable for the production of polymers formed by homopolymer blocks, other different polymer products may be obtained by utilizing the procedure of other embodiments of the invention. For example, two monomers such as vinylpyrene and acrylonitrile may be charged simultaneously into a reaction zone in the presence of a diluent and a polymerization initiator. This procedure would result in the formation of a homopolymer of the acrylonitrile or a copolymer containing a very small number of vinylpyrene units.

The particular type of polymerization initiator employed in the reaction also will have an effect on the final reaction product. For example, by selecting a particular polymerization initiator which has one anionic unit, such as a mono- functional alkyl or arylalkyl carbanion, a block copolymer having the general structure [A] [B], where [A] represents the segment comprised of one homopolymer and [B] represents a segment comprised of a different homopolymer, is formed. The A monomer is added first and the B monomer added subsequently. Or by employing a polymerization initiator which has two anionic units, a block copolymer having a general structure of [A] [B] [A] can be made. In this instance the B monomer is initially added to the reaction zone with the polymerization initiator and the A monomer is added subsequently. Polymerization initiators which function in this manner are the alkali metals, radical anions and difunctional alkyl and arylalkyl carbanions.

The polymerization process of the invention is carried out in the presence of a suitable solvent which, generally speaking, can be any which is aprotic in nature. Typical solvents which may be used include cyclic ethers, such as tetrahydrofuran; ethers such as dimethoxyethane and ethyl ether; aromatic and aliphatic hydrocarbons such as benzene and hexane respectively; or mixtures thereof. The monomers which can be polymerized according to the process of the invention and the reaction products obtained exhibit varying degrees of solubility in the different solvents which can be utilized. It will be recognized by those skilled in the art that the rate at which the polymerization reactions proceed is dependent to a large extent upon the solubility characteristics of the monomers and the reaction products in the solvent system. Thus, it is preferred, in any particular instance, to employ a solvent system in which the monomers(s) are completely soluble since the reaction would proceed at a relatively rapid rate. In an optimum embodiment according to the practice of the invention the solvent system selected is one in which the monomer(s) and the reaction product are soluble for should the latter begin to come out of solution as it is being formed the reaction is slowed to a considerable extent. It should be noted however that the process can be practiced effectively where the monomer(s) and/or the reaction product are only very slightly soluble in the solvent system.

The reaction may be carried out at a temperature in the range of from about −80°C to about 150°C. The particular temperature employed will be selected to some extent as a result of practical considerations attendant with the particular diluent system used in any given instance. Where polar solvents such as tetrahydrofuran are used the reaction proceeds relatively quickly and temperature considerations are not paramount. However, the reactions are generally slower in non-polar solvents than in polar solvents. Thus, when a hydrocarbon such as benzene is used, the reaction is preferably carried out at about 50°C to allow it to proceed at a relatively rapid rate. The reaction may be carried out under autogenous pressures and it is preferably accomplished at pressures sufficient to maintain the monomeric materials substantially in the liquid phase. The pressure, therefore, will depend upon the particular monomers being polymerized, the diluent system and the temperature at which the reaction is to proceed. It is possible, however, to use higher pressures, these being obtainable, for example, by pressurizing the reaction with a gas which is inert to the polymerization reaction.

The concentration of the monomers to be polymerized in the diluent system may be from less than 1 percent to any concentration desired. It is preferred to employ relatively low concentrations, i.e., from 5 percent to about 20 percent by weight because they permit of better mixing conditions in the reaction vessel, and result in more homogeneous material. The concentration of polymerization initiator material may vary over an extremely wide range. The maximum effective concentration of initiator would be the same as the concentration of monomer in the diluent. It is preferred to utilize an initiator concentration in the range of from about 1 part of initiator to 10 parts of monomer to 1 part of initiator to 5,000 parts monomer. It will be evident that the properties of the reaction products may be varied by varying the concentration of initiator material. For example, it is possible to alter the molecular weight of the polymer formed by varying the concentration of initiator material relative to the concentration of monomer present.

Various materials may be employed to terminate the reactions according to the process of the invention. These materials include water, oxygen, carbon dioxide, methanol, etc., and in general encompass any acidic-acting material which will donate a proton. Thus, it is critical to the process that the monomers and the equipment employed be substantially free of any polymerization terminators. Any of the known means for removing such contaminants may be utilized. The diluents employed should also be free of such impurities. It is desirable, therefore, to also remove substantially all of the air and moisture from the reaction vessel in which the polymerization is to be carried out. It is preferred to practice the process under anhydrous or substantially anhydrous conditions. After terminating the reaction with the materials described previously, the reaction products may then be recovered. It is generally preferred to add an amount of terminator material which is sufficient to end the reaction without causing the reaction product to precipitate out of solution. The dissolved polymer may then be precipitated from solution by adding an excess of a non-solvent such as methanol. It should be recognized that termination of the reaction and precipitation of the reaction product may be accomplished in one step if so desired. The precipitated polymer may be recovered by using various known techniques, e.g., filtration, decantation, etc. The polymer may then be further purified by techniques such as redissolving in a suitable solvent and recovery as described above.

The invention will now be described with respect to examples of specific preferred embodiments thereof, it being recognized that these are intended to be illustrative only and the invention is not limited to the materials, percentages and conditions recited therein. All parts and percentages are by weight unless other specified.

The vinylpyrene monomer used in all of the examples is prepared in the following manner. A 3 liter, 4 neck Morton flask equipped with a 500 cc dropping bottle is dried in an oven at 175°C and assembled under a blanket of argon gas. Into the flask is added 57.2 grams of triphenylmethyl phosphonium bromide (prepared by conventional procedure from triphenylphosphine and bromomethane in benzene) and 730 cc of tetrahydrofuran (THF). The slurry is stirred for 1 hour at 25°C under a blanket of argon and then 96.5 cc of n-butyl lithium (1.6M in n-hexane, available from Foote Mineral Co., Exton, Pa.) is added. After two hours, a solution made by dissolving 36.8 grams of 3-pyrene carboxaldehyde (available from Aldrich Chemical Co., Milwaukee, Wis.) in 260 cc of THF is added. The reaction is continued for three hours and the small amount of white precipitate formed is filtered off and discarded. The crude vinylpyrene is isolated by replacing the THF with methanol and filtering the solid monomer. The monomer is purified by chromatographing a benzene solution of the monomer through Woelm neutral alumina and finally by crystallization from absolute ethanol. Recovery is generally about 60 percent of the theoretical yield and the purified monomer has a melting point of 88°C and a NMR spectrum in agreement with the expected structure.

EXAMPLE I 2.6 grams of 3-vinylpyrene and 40 cc of THF are placed in a round bottom reaction flask which has previously been dried by heating under high vacuum and cooling under dry argon gas. The flask is flushed with argon for an additional 10 minutes and then capped with a rubber septum. The monomer is dissolved rapidly with stirring and the solution is then cooled to −78°C. After reaching temperature 0.25 cc of n-butyl lithium (1.6M in hexane) is added with a syringe and the initiation of polymerization is evidenced by the formation of a deep blue-green solution. After one-half hour the polymerization is terminated by the addition of 0.5 cc of methanol and the polymer then isolated by precipitation in a large excess of methanol (300 cc). The polymer is filtered and dried in a vacuum oven. The polymer yield is 2.5 grams.

Polyvinylpyrene prepared under these conditions has a molecular weight of 6,000, a molecular weight distribution of 1.2 and an inherent viscosity of 0.06 d 1/g for a 0.1 percent solution in THF at 25°C. The brittle, fluorescent, pale yellow solid is partially crystalline and has a glass transition temperature above 150°C.

EXAMPLE II

This polymerization is carried out under high vacuum. 10 grams of 3-vinylpyrene are added to a previously dried ampoule which is then evacuated to $10^{-5}$ torr. Subsequently 100 cc of dry THF is distilled into the ampoule which is then removed from the vacuum line by sealing with a torch. A solution of 10 grams of styrene in 100 cc of THF is prepared in the same manner with the exception that both materials are added to the ampoule by high vacuum distillation.

The block polymerization is carried out in a 0.5 liter flask equipped with a glass stirrer, vacuum inlet and separate ampoules containing the monomers, the initiator (phenyl isopropyl potassium which is prepared by reacting methyl phenylisopropyl ether with potassium metal in THF and filtering off the excess metal and potassium methoxide) and the methanol terminating agent. The reactor is evacuated to $10^{-5}$ torr and 200 cc of THF is vacuum distilled into the flask which is then sealed and immersed in an ice bath at 0°C. The initiator ampoule is then opened and 4 cc of 0.12M phenyl isopropyl potassium in THF is washed into the THF. The styrene monomer solution is then added in similar fashion and the living polystyrene block is immediately formed. The red polystyrene solution is stirred for one-half hour and the vinylpyrene monomer solution is then added. The solution instantaneously turns deep blue-green indicating the initiation of the polymerization of the vinylpyrene. The solution is stirred for one-half hour and 1 cc of methanol is then added to terminate the reaction. The decolorized solution is then added to a large excess of methanol and the block copolymer is precipitated. The polymer is filtered and oven dried.

The polystyrene-polyvinylpyrene block copolymer is very pale yellow, fluorescent and brittle. It has a molecular weight of 45,000 and a molecular weight distribution of 1.3. The composition of the copolymer is 48% polystyrene and 52% polyvinylpyrene. The block copolymer is of high purity and is photoconductive when electrically charged and subsequently discharged in accordance with the standard xerographic mode. It exhibits photoelectrical behavior approximating that of the polyvinylpyrene homopolymer.

EXAMPLE III

This polymerization is again carried out under high vacuum. The solutions of the monomers in THF are prepared in the same manner as described in Example II. The polymerization initiator employed is α-methylstyrene tetramer dianion which is prepared by contacting α-methylstyrene with sodium metal in THF overnight and filtering off the solids.

The procedures followed and the conditions present in reacting the materials are the same as those employed in Example II with the exception that 5 grams of styrene in 100 cc THF are used. The initiator concentration is 0.12M in THF. A polyvinylpyrene, polystyrene, polyvinylpyrene block copolymer is formed which has a molecular weight of 65,000 and a moelecular weight distribution of 1.3. The composition of the copolymer is 32 percent polystyrene and 68 percent polyvinylpyrene with the central polystyrene block having a molecular weight of about 21,000 and each terminal polyvinylpyrene block having a molecular weight of about 22,000. The block copolymer is high purity and is photoconductive when electrically charged and subsequently discharged in accordance with the standard xerographic mode. It exhibits photoelectrical behavior approximating that of the polyvinylpyrene homopolymer.

EXAMPLE IV

This polymerization is carried out in a clean dry beverage bottle capped with a rubber septum and rinsed with initiator solution to remove any impurities prior to the polymerization. A 3-vinylpyrene solution is prepared by dissolving 5 grams of monomer in 50 cc of dry benzene. 15 grams of freshly distilled isoprene (2-methyl-1,3 butadiene) is dissolved in 50 cc of benzene. The initiator is sec. butyl lithium. All solutions are flushed with dry argon gas prior to use.

100 cc of benzene and 0.5 cc initiator (1.0M solution in hexane) is syringed into the bottle. The solution is stirred and heated to 50°C and the isoprene solution is injected through the septum with a syringe. The reaction is allowed to proceed for five hours during which time the isoprene is polymerized quantitatively to living polyisoprene. The vinylpyrene solution is then added to the reactor whereupon the solution turns a deep blue-green color. The reaction is continued for an additional three hours and 1 cc of methanol is then added to terminate the polymerization. The block copolymer is then precipitated in excess methanol, filtered and dried in a vacuum oven.

The copolymer formed is a soft solid which forms self-supporting films and is slightly fluorescent. The copolymer has a molecular weight of about 35,000 and is composed of 79% polyisoprene and 21 percent polyvinylpyrene. It is photoconductive when electrically charged and subsequently discharged in the standard xerographic mode and exhibits photoelectrical behavior approximately that of the polyvinylpyrene homopolymer.

EXAMPLE V

This polymerization is carried out under high vacuum. A solution of 5 grams of isoprene in 100 cc of THF is prepared by high vacuum distillation of the monomer and solvent into an ampoule equipped with a breakseal. The preparation of the other reagents is the same as described in Example III with the exception that isoprene is used in place of the styrene and the reaction is at 25°C. The living polyisoprene is yellow colored.

The polyvinylpyrene, polyisoprene, polyvinylpyrene block copolymer is pale yellow, fluorescent and forms flexible films. The molecular weight of the copolymer is about 61,000 and it has a composition of 66 percent polyvinyl pyrene and 34 percent polyisoprene. It is photoconductive when electrically charged and subsequently discharged in the standard xerographic mode and exhibits photoelectrical behavior approximating that of the polyvinylpyrene homopolymer.

EXAMPLE VI

This polymerization is carried out under argon gas in a dry round bottom flask equippped with a rubber septum stopper. The initiator used is sodium naphthalene which is prepared by reacting stoichiometric quanties of sodium metal and pure naphthalene in THF at 25°C. A 2-vinylpyridine solution is prepared by dissolving 5 grams of freshly distilled monomer in 50 cc of dry THF.

Into the reactor is injected 100 cc of THF followed by 2 cc of sodium naphthalene initiator solution (0.12M in THF). The solution is cooled to −78°C and 10 grams of 3-vinylpyrene solution in 50 cc of THF is added. Polymerization is complete within one-half hour with the formation of a two ended living polyvinylpyrene dianion to which is then added the vinylpyridine solution. A color change of from blue to red signifies the initiation of the vinylpyridine polymerization. After one-half hour, 1 cc of methanol is added to terminate the reaction and the block copolymer is recovered by precipitation in n-hexane and drying in a vacuum oven.

The poly-2-vinylpyridine, polyvinylpyrene, poly-2-vinylpyridine block copolymer is a pale yellow, glassy solid with a molecular weight near 105,000. It has a composition of 61 percent polyvinylpyrene and 39 percent poly-2-vinylpyridine.

EXAMPLE VII

This polymerization is carried out under high vacuum conditions. A methylmethacrylate solution is prepared by distilling 10 grams of monomer, which has been dried over calcium hydride, into an ampoule and then distilling 50 cc of THF into the ampoule. The initiator used is a 0.12M solution of phenyl isopropyl potassium in THF.

The various ampoules containing the monomers are connected to a 0.5 liter flask which is subsequently dried by heating under high vacuum. 100 cc of THF is distilled into the flask which is then sealed from the vacuum line. 5 cc of the initiator solution is added to the flask and, after cooling to −78°C, a solution of 20 grams of vinylpyrene in 50 cc THF is added. The solution turns a deep blue-green color. After ½ hour the methyl methacrylate solution is added and the blue solution changes to a yellow color indicating block copolymer initiation. The reaction is continued for an additional 2 hours and then terminated with the addition of 1 cc of methanol. The block copolymer is precipitated in a large excess of methanol, recovered by filtration and dried in a vacuum oven.

The polyvinylpyrene, polymethyl methacrylate copolymer is a pale yellow, brittle solid which can be cast into clear, self-supporting films. The molecular weight of the copolymer is about 45,000 with a molecular weight distribution of 1.6 and a composition of 65 percent polyvinylpyrene and 35 percent polymethyl methacrylate.

EXAMPLE VIII

This polymerization is carried out under argon gas in a dry, round bottom flask equipped with a rubber septum stopper. 100 cc of THF is injected into the reactor and cooled to 0°C. 0.2cc of a 1.6M solution of n-butly lithuim in hexane is then added to the reactor. Immediately subsequent to this is added a solution of 10 grams of 3-vinylpyrene in 50 cc THF. The resulting deep blue-green colored living polyvinylpyrene solution is stirred for ½ hour and then a solution of 5 grams of freshly distilled acrylonitrile in 50 cc of THF is added. An immediate blue to yellow color change is observed which signifies initiation of the acrylonitrile polymerization. After one and one-half hours the copolymerization is terminated by adding 1 cc of methanol. The dissolved copolymer is precipitated in a large excess of methanol, recovered and dried.

The polyvinylpryene-polyacrylonitrile block copolymer is a yellow, glassy solid with a composition of 66 percent polyvinylpyrene and 34 percent polyacrylonitrile. The molecular weight of the copolymer is 45,000 and it has a broad molecular weight distribution.

EXAMPLE IX

This polymerization is carried out under high vacuum conditions. The equipment used is the same as that described in Example VII. The solvent used is dimethoxyethane which is dried oven calcium hydride and distilled before use. 10 grams of ethylene oxide monomer is dried over calcium hydride and distilled into an ampoule into which is subsequently distilled 50 cc of dimethoxyethane.

100 cc of THF is distilled into the flask followed by 2 cc of phenyl isopropyl potassium initiator solution (0.12M in THF) and the solution then cooled to 25°C. A solution of 10 grams of 3-vinylpyrene in 50 cc of dimethoxyethane is then added to the flask and the reaction is allowed to proceed for 8 hours. A solution of 10 grams of ethylene oxide in dimethoxyethane is then added to the flask with the blue living polyvinylpyrene solution turning colorless upon addition of the ethylene oxide monomer. After an additional eight hours the reaction is terminated with the addition of 1 cc of glacial acetic acid. The resulting copolymer is precipitated in n-hexane, recovered and dried. The copolymer is pale yelllow and crystalline with a molecular weight of 98,000 and a melting point of 60 °C. It has a composition of about 51 percent polyvinylpyrene and 49 percent polyethylene oxide.

EXAMPLE X

This polymerization is carried out under high vacuum conditions. The procedure used is similar to that described in Example II. A solution of octamethylcyclotetrasiloxane (Available from Peninsular Chemresearch, Gainesville, Fla.) in THF is prepared by adding 10 grams of the monomer, which is previously purified by distillation, and 100 cc of THF into an ampoule by high vacuum distillation.

100 cc of THF is added to the reactor followed by 4 cc of α-methylstyrene tetramer dianion (0.12M in THF) and the solution cooled to 0°C. A solution of 10 grams of 3-vinylpyrene in 100 cc of THF is added to the flask and the reaction is allowed to proceed for 2 ½ hours. The octamethylcyclotetrasiloxane solution is then added to the flask and the reaction is continued for 2 ½ hours after which it is terminated with the addition of 1 cc of methanol. The copolymer is precipitated, recovered and dried.

The polydimethylsiloxane, polyvinylpyrene, polydimethylsiloxane block copolymer is a soft, yellowish solid which forms flexible, self-supporting films. It contains 60 percent polyvinylpyrene and 40 percent polydimethylsiloxane.

EXAMPLE XI

This polymerization is carried out under argon in a dry, round bottom flask equipped with a rubber septum stopper. The toluene and tetralin used as solvents are dried over calcium hydride and distilled before use.

Into the flask are added 200 cc of toluene, 200 cc of tetralin and 10 grams of 3-vinylpyrene and the solution is warmed to 50°C. To this solution is added 0.25 cc of n-butyl lithium initiator solution (1.6M in hexane) and the monomer polymerized for 3 hours. The deep blue solution is then cooled to −30°C and to it is added 20 grams of acetaldehyde which is redistilled before use. Immediate discoloration occurs and the polymerization is continued for 9 hours after which is added 1 cc of benzoyl chloride to terminate the reaction. The copolymer is precipitated in n-hexane, recovered and dried.

The polyvinylpyrene, polyacetaldehyde block copolymer is a pale yellow, semi-crystalline solid containing 47 percent polyvinylpyrene and 53 percent polyacetaldehyde which forms self-supporting films.

EXAMPLE XII

This polymerization is carried out under argon gas in a dry round bottom flask equipped with a rubber septum stopper. The solvents are dried over calcium hydride and distilled before use.

Into the flask are added 100 cc of toluene, 100 cc of tetralin and 10 grams of 3-vinylpyrene. The solution is warmed to 50°C. To this solution is added 0.25 cc of n-butyl lithium (1.6M in hexane) and the monomer is polymerized for four hours. The solution is cooled to −30°C and to it is added 5 grams of butylisocyanate which is purified by distillation before use. The polymerization is continued for 12 hours after which 1 cc of methanol is added to terminate the reaction. The copolymer is precipitated in n-hexane, recovered and dried.

The polyvinylpyrene, poylbutylisocyanate block copolymer is a pale, yellow solid with a molecular weight near 60,000 and a broad molecular weight distribution. The copolymer contains about 75 percent polyvinylpyrene and 25 percent polybutylisocyanate and forms brittle, self-supporting films.

EXAMPLE XIII

This polymerization is carried out in a clear dry beverage bottle capped with a rubber septum and rinsed with initiator solution to remove any impurities prior to the polymerization. A 3-vinylpyrene solution is prepared by dissolving 8 grams of monomer in 50 cc of dry benzene. The initiator is lithium stilbene. All solutions are flushed with dry argon gas prior to use.

150 cc of benzene and 5.7 cc of initiator (0.10M in benzene) is syringed into the bottle. The bottle is capped and 12 grams of butadiene are passed into the solution in the bottle. The solution is stirred and heated to 50°C. The reaction is allowed to proceed for 5 hours during which time the butadiene is polymerized quantitatively to living polybutadiene. The vinylpyrene solution is then added to the reactor whereupon the solution turns a deep blue-green color. The reaction is continued for an additional 3 hours and 1 cc of methanol is then added to terminate the polymerization. The block copolymer is then precipitated in methanol, filtered and dried.

The copolymer forms tough, flexible, self-supporting films and is composed of about 60 percent polybutadiene and 40 percent polyvinylpyrene. It has a molecular weight of about 70,000 with the central polybutadiene block having a molecular weight of about 40,000 and each terminal polyvinylpyrene block having a molecular weight of about 15,000. The copolymer is photoconductive when electrically charged and subsequently discharged in accordance with the standard xerographic mode. It exhibits photoelectrical behavior approximating that of the polyvinylpyrene homopolymer.

It will be appreciated by those skilled in the art as a result of the disclosure that the process of the invention makes it possible to obtain products having widely ranging properties and desired characteristics, e.g., rubbery or plastic materials. It is possible thereby to alter the characteristics of the monomers reacted according to the process. For example, in the case where ethylene oxide is copolymerized with vinylpyrene, polymers of varying water permeability characteristics may be made by varying the relative amounts of ethylene oxide, a water soluble material, and vinylpyrene in the final product. Mechanical properties, such as, the flexibility of the polymers may be controlled by forming polymers having the relatively brittle polyvinylpyrene attached to relatively rubbery segments, such as, polybutadiene or polydimethylsiloxane to provide products which can be cast into tough, flexible films. Thus, it is evident that the novel block polymers made according to the invention have utility in a wide variety of applications. Generally, these polymers have utility where plastic polymers and natural and synthetic rubbers are used. Depending upon their particular characteristics, individual polymers may be used as permeable films capable of controlling the passage of moisture or as xerographic toners or they may be cast into regular films having periodic spacings capable of diffracting light whereby they are suitable for use as diffraction gratings in spectroscopic applications. Some of the block polymers may be utilized as compatibilizing agents for polyblends of materials having similar chemical structure and in this manner enhance the dispersibility of one material in another. A significant advantage of the invention resides in the discovery that unique block polymers which combine good photoelectric and mechanical properties in a single polymeric unit can be made. This combination of photoelectric and mechanical properties in a polymer is unexpected since, heretofore, organic photoconductors have generally been brittle materials.

While the invention has been described in detail with respect to preferred embodiments thereof, it is not intended to be limited thereto, but rather it will be appreciated by those skilled in the art the modifications and variations are possible which are within the spirit of the invention and the scope of the claims. For example, while the block polymers preferably contain either two or three segments, it is within the scope of the invention to prepare polymers having any number of polymer blocks.

What is claimed is:

1. A process for preparing homopolymers of 3-vinylpyrene which comprises contacting a 3-vinylpyrene monomer with a polymerization initiator selected from the group consisting of alkali metals, anion radical adducts and monofunctional and difunctional alkyl and arylalkyl carbanions in the presence of an aprotic diluent.

2. A process for preparing block copolymers containing poly-3-vinylpyrene segments comprising the steps of contacting a first monomer selected from the group consisting of 3-vinylpyrene and monomers susceptible to nucleophilic addition with a polymerization initiator selected from the group consisting of alkali metals, anion radical adducts, monofunctional and difunctional alkyl and arylalkyl carbanions in the presence of an aprotic diluent so as to form a homopolymer segment of said first monomer and, after polymerization of substantially all of said first monomer, introducing a second monomer to said first formed polymer segment in the presence of said aprotic diluent, said second monomer being selected from the group consisting of 3-vinylpyrene and monomers susceptible to nucleophilic addition, said second monomer being different than said first monomer and being one which is capable of being polymerized by contact with said first formed polymer segment in the presence of said aprotic diluent and said first or second monomer being 3-vinylpyrene.

3. The process as defined in claim 2 in which said monomers susceptible to nucleophilic addition are selected from the group consisting of dienes, vinyl substituted aromatic hydrocarbons, vinyl substituted heteroaromatics, methacrylates, acrylates, vinyl substituted nitriles and N,N-disubstituted amides, aldehydes, isocyanates, siloxanes, cyclic ethers, cyclic thioethers, and lactones.

4. The process as defined in claim 2 in which said first monomer is 3-vinylpyrene and said second monomer is chosen from the group consisting of styrene, isoprene and 1,3 butadiene.

5. The process as defined in claim 2 in which said first monomer is 3-vinylpyrene and said second monomer is isoprene.

6. The process as defined in claim 4 in which said polymerization initiator is chosen from the group consisting of alkali metals, anion radical adducts and difunctional alkyl and arylalkyl carbanions.

7. The process as defined in claim 5 in which said polymerization initiator is chosen from the group consisting of alkali metals, anion radical adducts and difunctional alkyl and arylalkyl carbanions.

8. The process as defined in claim 6 in which said polymerization initiator is an alkali metal and said diluent is tetrahydrofuran.

9. The process as defined in claim 2 in which said first monomer is not substantially completely reacted during the first contacting step and said second monomer is then added to give a block copolymer comprising a homopolymer segment of said first monomer and a copolymer segment of said first and second monomers.

10. The process as defined in claim 2 in which two different monomers are added together in the first contacting step.

11. A block copolymer which consists essentially of block polymer segments bonded together, at least one of said segments being poly-3-vinylpyrene and at least one of said segments being a polymer of a monomer which is susceptible to nucleophilic addition.

12. A block copolymer as defined in claim 11 which consists essentially of three block polymer segments.

13. A block copolymer as defined in claim 12 in which the terminal segments are poly-3-vinylpyrene.

14. A block copolymer as defined in claim 13 in which the central segment is a homopolymer segment chosen from the group consisting of polystyrene, polyisoprene and polybutadiene.

15. A block copolymer as defined in claim 11 wherein said polymer of a monomer which is susceptible to nucleophilic addition is a polymer of a monomer chosen from the group consisting of dienes, vinyl substituted aromatic hydrocarbons, vinyl substituted heteroaromatics, methacrylates, acrylates, vinyl substituted nitriles and N,N-disubstituted amides, aldehydes, isocyanates, siloxanes, cyclic ethers, cyclic thioethers and lactones.

* * * * *